United States Patent [19]
Wendel et al.

[11] 3,710,762
[45] Jan. 16, 1973

[54] METHOD AND APPARATUS FOR PNEUMATIC CONVEYING ARTICLES

[75] Inventors: John S. Wendel; Lavern L. Kaiser; Dwight Grille, all of Fort Recovery, Ohio

[73] Assignee: said Wendel and Kaiser, by said Grille

[22] Filed: July 7, 1971

[21] Appl. No.: 160,274

[52] U.S. Cl. ..................................... 119/82, 302/23
[51] Int. Cl. ............................................ A01k 29/00
[58] Field of Search ............. 119/82; 302/23, 25, 17; 43/6.5

[56] References Cited

UNITED STATES PATENTS

| | | | |
|---|---|---|---|
| 3,279,862 | 10/1966 | Hubbard | 302/23 X |
| 3,285,670 | 11/1966 | Do | 302/23 |
| 3,304,126 | 2/1967 | Rupp et al. | 302/21 |
| 3,373,883 | 3/1968 | Ostberg | 214/14 |
| 3,460,327 | 8/1968 | Johnson et al. | 56/328 |
| 3,568,643 | 3/1971 | Wessinger | 119/82 |

*Primary Examiner*—Aldrich F. Medbery
*Attorney*—Jacox & Meckstroth

[57] ABSTRACT

Live chickens are conveyed through a conduit including a suction intake section connected to a pressure discharge section by an intermediate section having an air suction port, a pivotable door, and an air pressure port within each end portion. Air is alternately sucked through the suction ports and is alternately blown through the pressure ports by operation of a valve system actuated in response to a device which sense the presence of each chicken within the conduit. The pressure within the discharge conduit section is sensed for controlling the flow rate of the air blown through the discharge section to assure that the chickens flow at a substantially uniform rate through the duct.

17 Claims, 7 Drawing Figures

PATENTED JAN 16 1973 3,710,762

INVENTORS
JOHN S. WENDEL
LAVERN L. KAISER
DWIGHT GRILE

BY Jacox & Meckstroth
ATTORNEYS

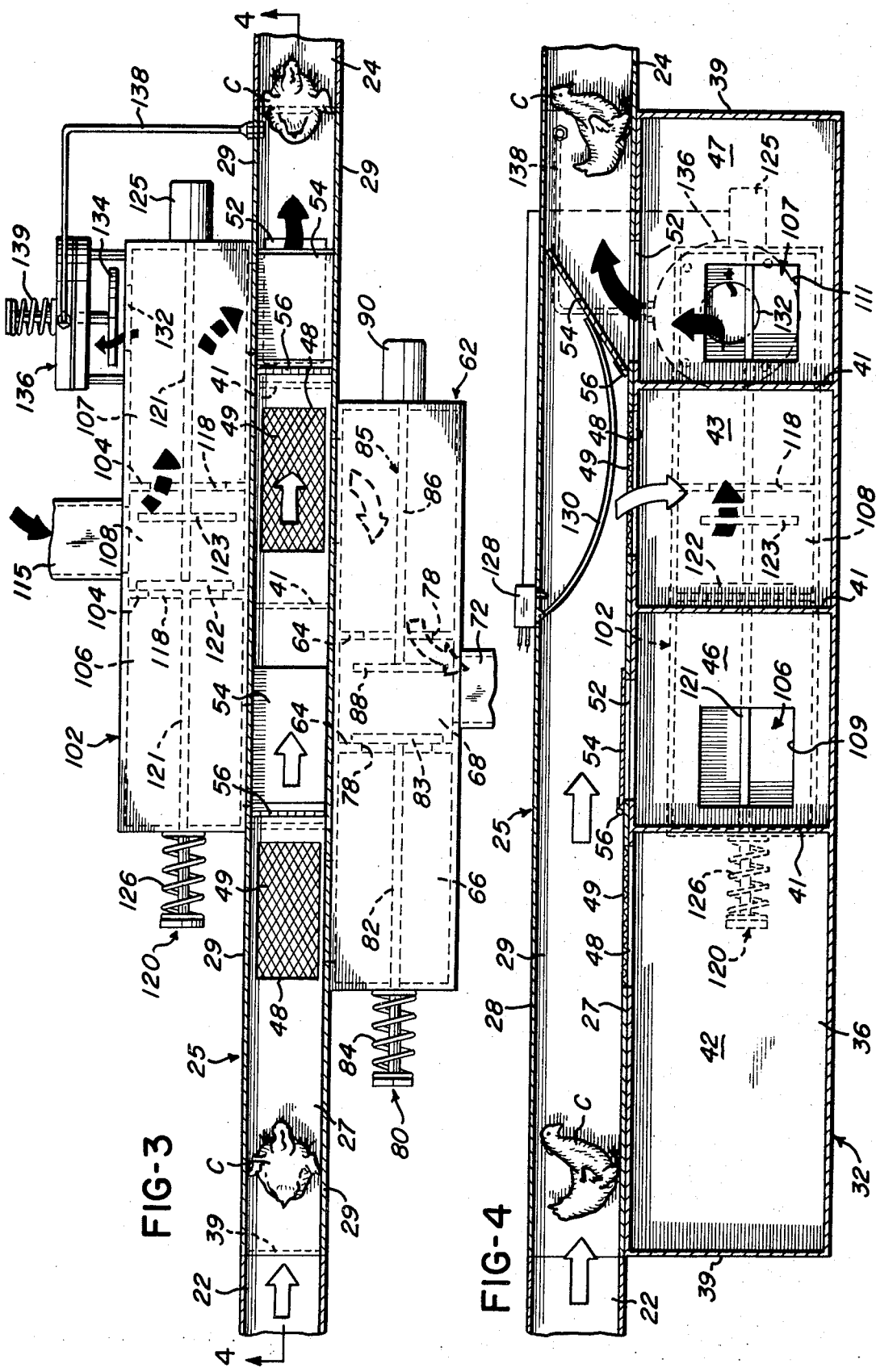

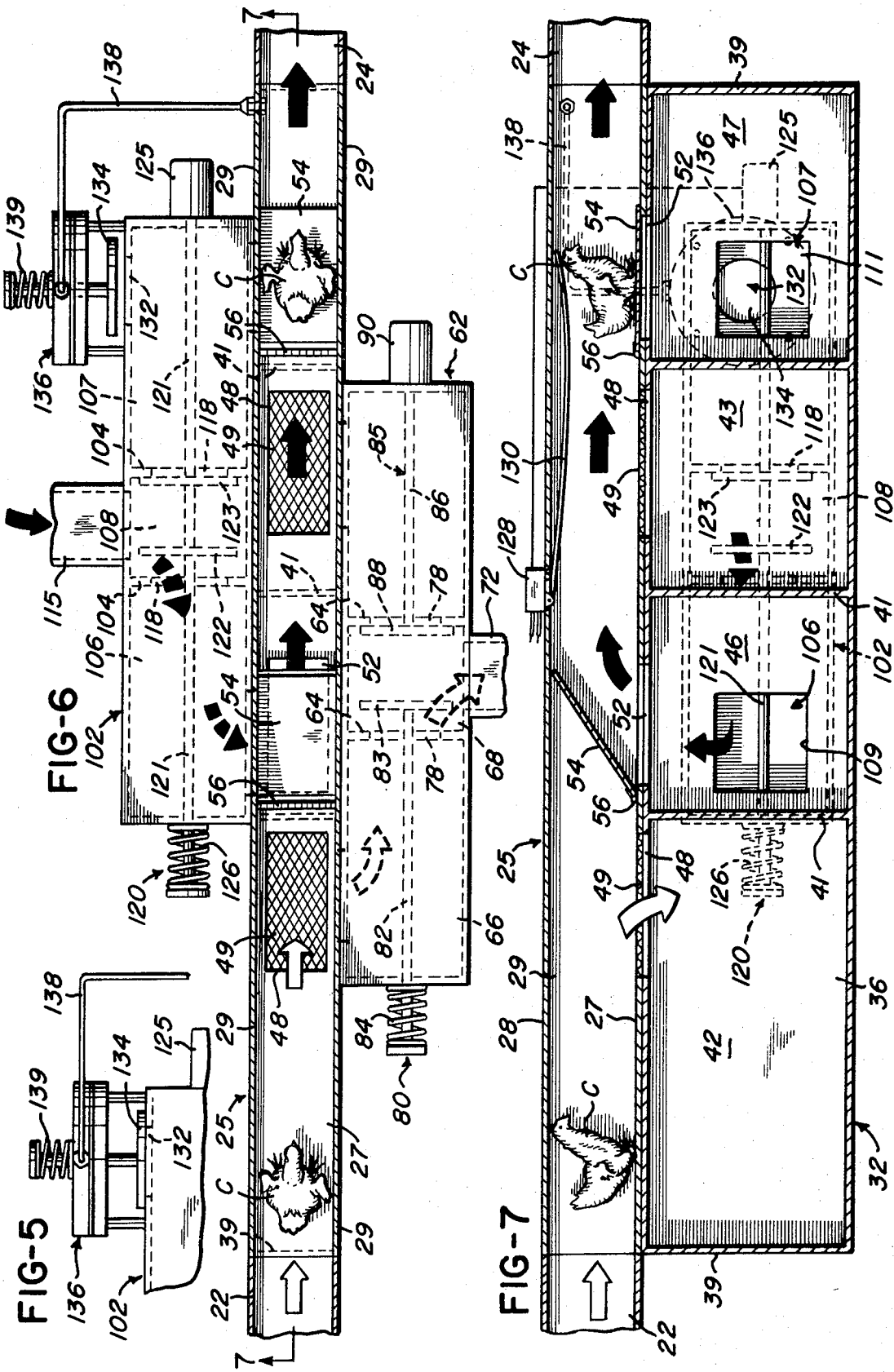

METHOD AND APPARATUS FOR PNEUMATIC CONVEYING ARTICLES

BACKGROUND OF THE INVENTION

In the industry of raising chickens which are sold for cooking, it is common to raise thousands of chickens in one building or brooder house and to use a conveying system for delivering a continuous supply of feed to the chickens. After the chickens have grown to the desired size and weight for processing, they are usually manually collected in batches and placed in suitable coops or cages which are stacked and transported, for example, by a fork lift truck, to a flat bed road truck. To simplify collecting the chickens and placing them within the cages and then transporting the cages, a large vacuum system has been developed to suck the chickens into a large upright tower which is usually located adjacent the truck bed on which the filled cages are to be stacked. As the chickens are sucked up into the top of the tower, they are then directed downwardly through a pipe or duct with the aid of gravity and some pressurized air produced by an aspirating or venturi system within the discharge duct.

It has been found that the use of such a venturi system requires a substantially high flow rate of air and for the suction tower be located relatively close to the cages to which the chickens are delivered. In addition, it has been found that the venturi pulls or sucks feathers from the live chickens and significantly changes the speed of the chicken in the area of the venturi so that the chickens do not flow at a substantially uniform rate through the duct. Furthermore, the substantial height of the suction tower usually prevents the tower and the delivery truck from being positioned within the brooder house, thus frequently requiring a substantially long suction line and a correspondingly high suction pressure to deliver the chickens from both ends of the brooder house to the suction tower.

SUMMARY OF THE INVENTION

The present invention is directed to an improved apparatus and method for pneumatically conveying or transporting articles and which is ideally suited for successively conveying live chickens, turkeys and the like from a brooder house to cages or other containers used for delivering the chickens to a processing plant. It is to be understood, however, that the method and apparatus of the invention are not limited to conveying or transporting only live chickens, turkeys or other birds, but may also be used for transporting other types of articles, for example, packages, food items, cans and other containers.

The invention provides the features of conveying the articles through a duct or conduit at a substantially uniform rate by using the same air which sucks each article through a first portion or section of the conduit to blow the article through the second portion or section of the conduit. The conveyor apparatus is particularly suited for conveying live chickens in that each chicken is subjected to a substantially uniform differential pressure as it is traveling through the conduit and is not subjected to any localized high velocity air stream such as produced by a venturi. In addition, each chicken is positively sucked and blown through the conduit so that the suction and blowing system may be located at approximately the center of the length of the conduit to minimize the power required from producing a uniform flow rate of air through the conduit. Furthermore, the apparatus of the invention is compact and, if desired, may be conveniently located within a brooder house to minimize the length of the conduit and to simplify the use of the apparatus.

In accordance with a preferred embodiment of the invention, a conduit includes a suction intake section which is connected to a pressure discharge section by an intermediate section having an air suction port and an air pressure port within each end portion. Each pressure port is normally closed by a flap type door which is pivotable to a position blocking the flow of air through the intermediate conduit section. The suction ports are connected by a duct from which a conduit extends to the inlet of an air blower or turbine, and the pressure ports are connected by a duct from which a conduit extends to the outlet of the turbine. A valve system is provided within each duct for alternately connecting the suction conduit from the turbine to the suction ports and for alternately connecting the pressure conduit from the turbine to the pressure ports.

The valve systems are actuated by a device which senses each article flowing into the intermediate section of the conduit so that the article is transferred from the suction system to the pressure system by alternately using each set of suction and pressure ports. The apparatus also provides for sensing the pressure within the discharge conduit section for controlling the flow of air through the pressure ports and into the intermediate section of the conduit so that the articles are conveyed at a substantially uniform flow rate.

Other features and advantages of the invention will be apparent from the following description, the accompanying drawings and the appended claims.

BRIEF DESCRIPTION OF THE DRAWINGS

FIG. 3 is a plan view, in part section, of a portion of the apparatus shown in FIGS. 1 and 2, and illustrating the apparatus in one condition of operation;

FIG. 4 is a section of the apparatus taken generally on the line 4 — 4 of FIG. 3;

FIG. 5 is a fragmentary plan view of a portion of the apparatus shown in FIG. 3 and illustrating another condition of operation;

FIG. 6 is a view similar to FIG. 3 and illustrating the apparatus in another condition of operation; and FIG. 7 is a section view similar to FIG. 4 and taken generally on the line 7 — 7 of FIG. 6.

DESCRIPTION OF THE PREFERRED EMBODIMENT

Figure 1:
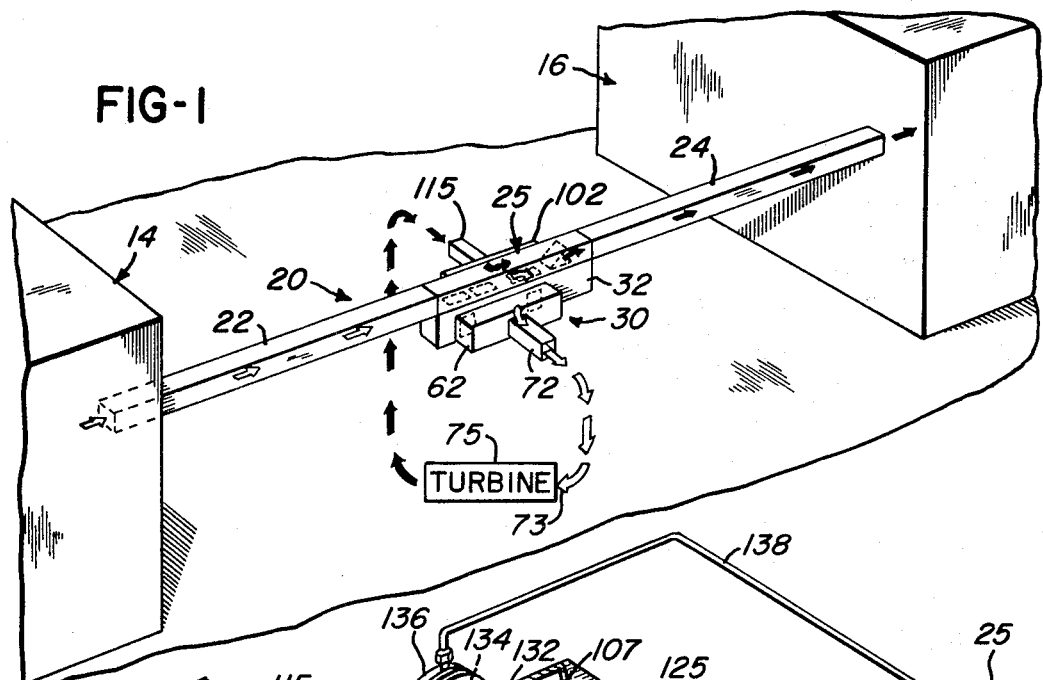
FIG. 1 is a perspective view of a pneumatic article conveying system or apparatus constructed in accordance with the invention.

The pneumatic conveying system or apparatus illustrated in FIG. 1, is constructed in accordance with the invention for successively transporting articles in the form of a large number of chickens C (FIGS. 3 and 4) from a first enclosure 14 to a second enclosure 16. As mentioned above, the enclosure 14 usually consists of a brooder house where thousands of chickens are raised to a desired size and weight for processing. The enclosure 16 diagrammatically represents a coop or cage in which a batch of chickens are collected.

The conveying apparatus includes a conduit 20 consisting of a suction intake section 22 and a pressure discharge section 24 which are connected by an intermediate operating mechanical section 25. Preferably, the intermediate section 25 has a rectangular cross sectional configuration defined by a bottom wall 27 and a top wall 28 connected by side walls 29. The conduit sections 22 and 24 are illustrated in the form of rigid ducts having a rectangular cross sectional configuration; however, these sections may be flexible and of circular cross sectional configuration without departing from the scope of the invention.

The intermediate conduit section 25 forms a part of a suction and blowing system 30 which further includes a box-like duct or housing 32 secured to the bottom wall 27 of the conduit section 25. The housing 32 includes parallel spaced side walls 34 and 36 which are rigidly connected by a bottom wall 38 and opposite end walls 39. A set of three intermediate vertical walls 41 divide the housing 32 into a set of spaced suction chambers 42 and 43 and two pressure chambers 46 and 47.

A pair of longitudinally spaced rectangular suction ports 48 and formed within the bottom wall 27 of the conduit section 25 and open the conduit section to the corresponding suction chambers 42 and 43. Each of the ports 48 is covered by a flat screen or grate 49 which extends flush with the inner surface of the bottom wall 27. A pair of longitudinally spaced rectangular exhaust or pressure ports 52 are also formed in the bottom wall 27 of the conduit section 25 and open the conduit section to the corresponding pressure chambers 46 and 47. Each of the ports 52 is normally closed by a flap type closure member in the form of a flat door 54 which is attached to the bottom wall 27 by a hinge 56. Each of the doors 54 is movable between a horizontal position closing the corresponding pressure port 52 to an inclined position closing or blocking the flow of air through the intermediate conduit section 25. Thus, each end portion of the conduit suction 25 includes a suction port and an exhaust port between which is hinged a door 54.

A box-like suction housing or duct 62 is secured to one of the side walls of the housing 32 and includes a pair of intermediate partitions or walls 64 which divide the duct 62 into two suction chambers 66 and 67 separated by a suction chamber 68. The adjacent walls of the ducts 32 and 62 have mating rectangular openings 69 which connect the suction chamber 42 within the duct 32 to the suction chamber 66 within the duct 62. Similarly, mating rectangular openings 71 within the adjacent walls of the ducts 32 and 62, serve to connect the suction chamber 43 within the duct 32 to the suction chamber 67 within the duct 62. The suction chamber 68 within the duct 62, is connected to a suction duct or conduit 72 which, in turn, connects to the inlet 73 of an air blower or turbine 75 as shown by the open arrows in FIG. 1. The turbine is driven by a suitable power source such as a gasoline engine (not shown).

Figure 2:
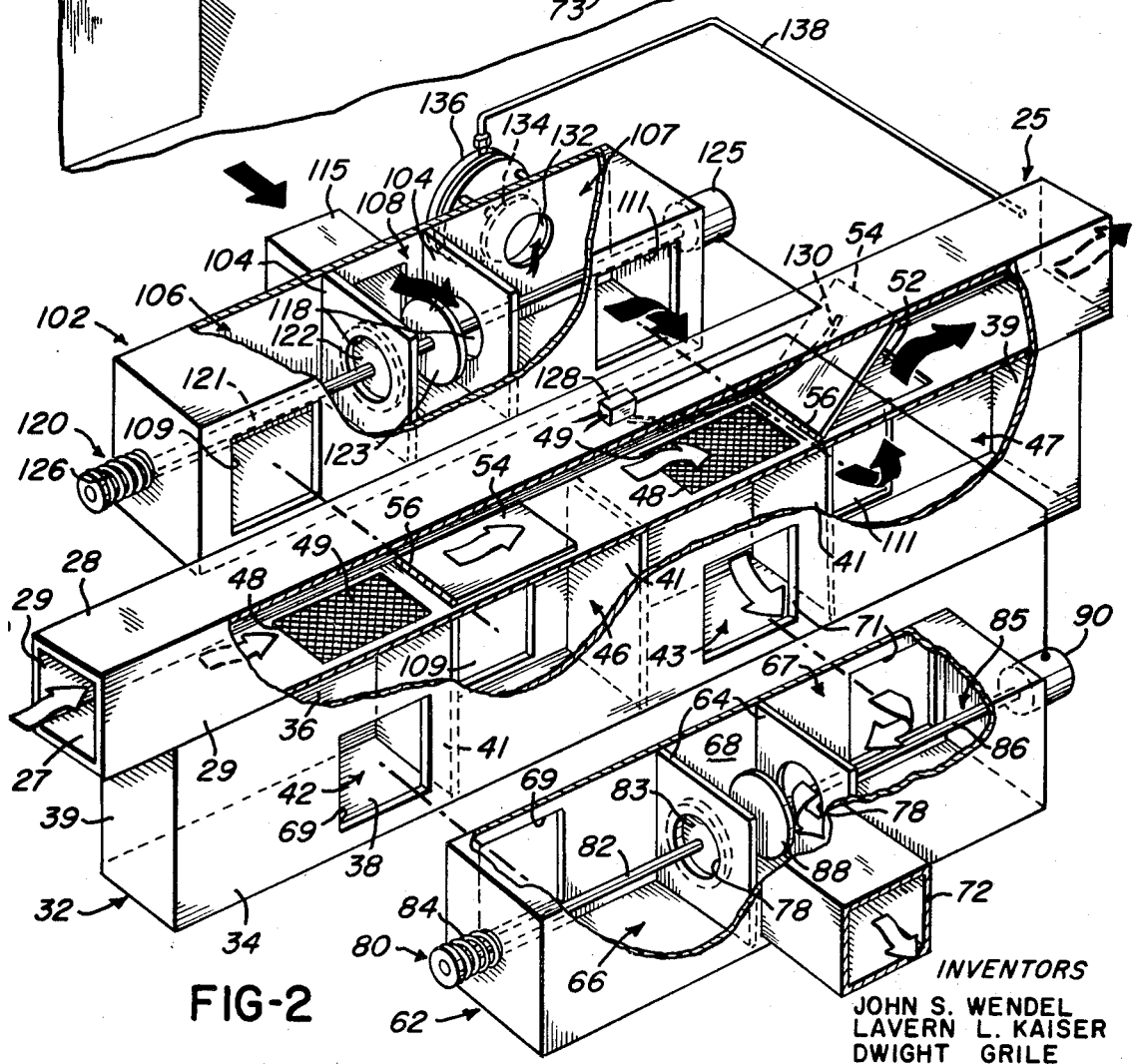
FIG. 2 is an enlarged partially exploded view of a portion of the conveying apparatus shown in FIG. 1 and with sections broken away to show internal construction.

A pair of circular holes or openings 78 are formed within the intermediate walls 64 of the duct 62 so that the suction chambers 66 and 67 may be alternately connected with the suction conduit 72 through the suction chamber. A valve member 80 includes a stem or rod 82 which extends through the suction chamber 66 and supports a circular disc-like valve head 84 which normally closes the corresponding opening 78 under the bias of a compression spring 84 mounted on the opposite end portion of the rod 82 projecting from the duct 62. A similar valve member 85 includes a stem or rod 86 which extends through the suction chamber 67 and supports a disc-like head 88. The head 88 is movable between an open position (FIG. 2) and a closed position (FIG. 6) closing the corresponding opening 78, in response to actuation of a solenoid 90 connected to the opposite end portion of the rod 86.

A pressure housing or duct 102 is secured to the opposite side wall 34 of the center duct or housing 32 and is constructed similarly to the duct 62. That is, the duct 102 includes a pair of intermediate walls 104 which define pressure chambers 106 and 107 on opposite sides of a pressure plenum or chamber 108. Rectangular openings 109 and 111 are formed within the adjacent walls of the ducts 32 and 102 for connecting the pressure chambers 106 and 107 to the corresponding pressure chambers 42 and 43 within the center duct 32. The pressure chamber 108 is connected by a conduit 115 to the output or pressure side of the air turbine 75 as illustrated by the solid arrows in FIG. 1.

The intermediate walls 104 of the duct 102, have circular openings 118 which correspond to the opening 78 within the intermediate walls 64 of the duct 62. A valve member 120 includes a stem or rod 121 which extends through all of the pressure chambers 106–108. The rod 121 supports a pair of circular disc-like head members 122 and 123 and is adapted to be actuated by a solenoid 125 secured to one end portion of the rod 121, and a spring 126 normally urges the head member 122 to a position closing the corresponding opening 118 which connects the pressure chambers 106 and 108. Thus the head member 123 is in a normally open position relative to the corresponding opening 118 so that the pressure chambers 107 and 108 are open to receive pressurized air flowing from the turbine 75 through the conduit 115. The solenoids 90 and 125 are simultaneously energized by closing of a switch 128 (FIGS. 4 and 7) operated by a flexible wire actuator 130 which extends longitudinally within the conduit section 25 above the downstream suction and pressure ports 48 and 52.

The outer side wall of the duct 102 has a circular opening 132 which opens the pressure chamber 107 to atmosphere. A circular disc-like valve member 134 (FIG. 3) is positioned adjacent the opening 132 and is moved between an open position (FIG. 3) and a closed position (FIG. 5) by a diaphragm operator 136 which is actuated in response to changes in air pressure received through a tube or line 138 connected to the outlet end portion of the intermediate conduit section 25. A compression spring 139 normally urges the valve member 134 to its open position, and air pressure within the diaphragm operator 136, urges the valve member 134 to a position closing the opening 132.

When transporting or conveying articles such as live chickens C, the apparatus operates in the following manner. The air turbine 75 is operated so that air is sucked or pulled through the port 48 (FIG. 2) within the outlet end portion of the conduit section 25, through the suction chambers 43 and 67 and through the normally open valve opening 78 into the suction conduit 70 extending to the inlet of the air turbine 75. Simultaneously, the turbine 75 forces pressurized air through the conduit 115, through the normally open valve opening 118 (FIG. 2) and the pressure chambers 107 and 47 so that pressurized air is exhausted upwardly through the pressure port 52 within the outlet end portion of the conduit section 25. This pressurized air forces the corresponding door 54 upwardly to a position blocking the flow of air through the intermediate conduit section 25 and producing a pressurized flow of air through the pressure discharge conduit section 24.

The chickens are placed within the inlet of the conduit section 22, preferably one at a time, and are carried by the suction into the intermediate conduit section 25. When a chicken contacts the flexible wire actuator 130, the switch 128 closes to energize simultaneously both of the solenoids 90 and 125. Energizing of the solenoids causes the valve members 85 and 120 to close the corresponding ports or openings 78 and 118. The suction within the conduit 72 is sufficient to pull the valve member 80 inwardly and thereby open the corresponding port 78 so that a suction is produced within the chambers 42 and 66. This causes a flow of air to be pulled or sucked through the corresponding suction opening 48 within the bottom wall of the conduit section 25.

When the solenoid 125 is energized, the valve member 120 shifts so that the head member 123 closes the corresponding port 118 and the head member 122 opens the other port 118 whereby the pressurized air flows from the conduit 115 into the pressure chambers 106 and 46. The pressurized air within the chamber 46 forces the corresponding door 54 upwardly to open the corresponding pressure port 52 and to block the flow of air through the conduit section 25. As a result, the suction air flow and the pressurized air flow are transferred from in front of the chicken C or from the discharge end portion of the conduit section 25, to in back of the chicken C or to the inlet end portion of the conduit section 25. The chicken is thereby blown outwardly through the discharge section 24 of the conduit 20.

After the chicken passes the actuator 130 (FIG. 4), the actuator returns to its normal position, and the switch 128 returns to its normally off position, thereby de-energizing the solenoids 90 and 125. The valve members 80, 85 and 120 then return to the positions as shown in FIG. 2 so that the air is again pulled through the suction port 48 and is blown back into the conduit section 25 through the pressure port 52 within the discharge end portion of the intermediate conduit section 25. Thus, when each chicken arrives within the center portion of the intermediate conduit section 25, between the two doors 54, the suction air flow and pressurized air flow are momentarily transferred from in front of the chicken to in back of the chicken so that the chicken is blown through the discharge end portion of the intermediate conduit section 25 and then through the pressure discharge conduit section 24.

When the conduit section 24 has a substantial length, and a number of chickens are present in the conduit section at any given instant, the air pressure increases within the discharge section 24 and is sensed within the air pressure line 138. The increase pressure in the line 138 causes the diaphragm operator 136 to move the valve member 134 to a position either closer to the opening 132 or actually closing the opening to restrict the normal exhaust of air through the opening. As a result, the conduit section 25 receives an increased flow of pressurized air which is effective to assure that all of the chickens in the discharge conduit section 24 continue to flow at a substantially uniform rate and do not collect within the conduit section.

From the drawings and the above description, it is apparent that a pneumatic conveying system constructed in accordance with the present invention, provides several desirable features and advantages. One important feature is that the articles being conveyed are sucked through the intake conduit section 22 with substantially the said differential pressure as they are blown through the pressure discharge section 24 so that the articles are transported at substantially uniform rate through the conduit 20. This feature also enables the intermediate conduit section 25 and the suction and blowing system 30 to be located within generally the center portion of the conduit 20. This provides for minimizing the flow rate of air required to convey a series of articles, and for minimizing the power required to drive the air blower or turbine 75.

The conveying system is especially suited for handling live fowl such as chickens, turkeys and the like, in that each bird is subjected to a substantially uniform differential pressure throughout the entire length of the conduit 20 and is not subjected to quick changes in pressure or velocity or localized suctions which tend to pull the feathers from the bird. The valving system of the apparatus is important in that it provides for a positive flow of air through the conduit 20 and thereby assures that each article or bird is positively conveyed. The valving system is also adapted to operate very quickly so that the conveying system can handle a rapid succession of articles.

A further desirable feature is provided by permitting a small flow of air to escape through the opening 132 and then restricting the air flow from the opening in response to an increase in pressure within the discharge section 24 of the conduit. This control mechanism enables the turbine 75 to be operated at a constant speed, but provides for additional pressurized air immediately on demand to assure that the articles do not collect within the pressure discharge section 24. For example, when the discharge section 24 is long or when the discharge end of the conduit section 24 is located at a higher elevation than the intermediate conduit section 25, the additional volume of air aids in conveying the articles through the discharge section.

While the method and form of pneumatic conveying apparatus herein described constitute a preferred embodiment of the invention, it is to be understood that the invention is not limited to this precise method and form of apparatus, and that changes may be made therein without departing from the scope and spirit of the invention.

The invention having thus been described, the following is claimed:

1. Apparatus for successively conveying articles through a conduit including an intake portion connected to a discharge portion by an intermediate portion, comprising means for sucking air from said intermediate portion of said conduit and for producing a flow of air through said intake portion to deliver each article to said intermediate portion, means for blowing air into said intermediate portion of said conduit and for producing a flow of air through said discharge portion of said conduit from said intermediate portion, means for sensing each article delivered to said intermediate section, and means responsive to said sensing means controlling the separation of sucking air and blowing air for transferring each article from said suction means to said blowing means.

2. Apparatus as defined in claim 1 wherein said sucking and blowing means include spaced openings within said intermediate portion, and said transferring means comprise a valve system effective to produce alternately sucking and blowing through said openings within said intermediate portion.

3. Apparatus for successively conveying articles through a conduit including a first section connected to a second section by an intermediate section, comprising means for sucking air from a first portion of said intermediate section and for producing a flow of air through said first section of said conduit toward said intermediate section to deliver each article to said intermediate section, means for blowing air into a second portion of said intermediate section of said conduit and for producing a flow of air through said second section of said conduit from said intermediate section, means for sensing each article delivered to said intermediate section, and means responsive to said sensing means for controlling sucked and blown air for transferring each article from said first portion of said intermediate section to said second portion.

4. Apparatus as defined in claim 3 wherein said first and second portions of said intermediate section comprises outlet and inlet end portions respectively, each said end portion having means defining a suction port and a pressure port, a closure member between each set of said suction and pressure ports, each said closure member being movable between a position closing the corresponding said pressure port and a position blocking the flow of air through said intermediate section, and valve means actuated by said sensing means for alternately transferring said sucking and blowing means between said end portions of said intermediate section and to the corresponding said suction and pressure ports.

5. Apparatus as defined in claim 4 wherein each said closure member is movable from said position closing the corresponding pressure port to said position blocking the flow of air through said intermediate section in response to air blowing through the corresponding pressure port.

6. Apparatus as defined in claim 4 including first duct means for connecting said suction ports, said air sucking means being connected to said first duct means, and said valve means including a first valve system within said first duct means for alternately connecting said air sucking means to said suction ports.

7. Apparatus as defined in claim 6 including second duct means for connecting said pressure ports within said intermediate section, said air blowing means connected to said second duct means, and said valve means including a second valve system within said second duct means for alternately connecting said air blowing means to said pressure ports.

8. Apparatus as defined in claim 7 wherein said first and second valve system each comprise a solenoid actuated valve member, and said sensing means comprise a switch connected to control said valve members.

9. Apparatus as defined in claim 8 wherein said sensing means further include a member projecting into said intermediate section of said conduit and adapted to be engaged by each article delivered to said intermediate section for actuating said switch.

10. Apparatus as defined in claim 3 including means for sensing the air pressure within said second section of said conduit, and means for controlling the flow rate of air through said second section in response to said air pressure sensing means to effect a substantially uniform flow rate of articles through said second section of said conduit.

11. Apparatus for successively conveying live fowls through a conduit including a first section connected to a second section by an intermediate section, comprising means for sucking air from a first portion of said intermediate section and for producing a flow of air through said first section of said conduit toward said intermediate section to deliver each live fowl to said intermediate section, means for blowing air into a second portion of said intermediate section of said conduit and for producing a flow of air through said second section of said conduit from said intermediate section, means for sensing the air pressure within said second section of said conduit, and means for controlling the flow rate of air through said second section in response to said air pressure sensing means to effect a substantially uniform flow rate of live fowls through said second section of said conduit.

12. A method of successively conveying articles through a conduit having a first portion connected to a second portion by an intermediate portion, comprising the steps of sucking air from said intermediate portion of the conduit to produce a flow of air through said first portion of the conduit toward said intermediate portion, placing each article into the air flow to deliver the article to said intermediate portion, sensing the presence of each article delivered to said intermediate portion, and diverting the sucked air from the intermediate portion and simultaneously blowing air into said intermediate portion behind each article in response to sensing an article delivered to said intermediate portion for producing an air flow within said second portion of the conduit to deliver each article from said intermediate portion through said second portion of the conduit.

13. A method of successively conveying articles through a conduit having a first section connected to a second section by an intermediate section, comprising the steps of sucking air from the outlet end portion of said intermediate section of the conduit to produce a flow of air through said first section and said intermediate section of the conduit, placing each article into the air flow to deliver the article to said intermediate section, sensing the presence of each article delivered to said intermediate section, and blowing air into the inlet end portion of said intermediate section and behind each article in response to sensing the presence of each article delivered to said intermediate section for producing an air flow within said second section of the conduit to deliver each article from said intermediate section through said second section of the conduit.

14. A method as defined in claim 13 including the step of alternately sucking and blowing air within said opposite inlet and outlet end portions of said intermediate section in response to sensing the articles delivered to said intermediate section of the conduit.

15. A method as defined in claim 14 including the steps of locating a suction port and a pressure port within each of said inlet and said outlet end portions of said intermediate section, locating a movable closure member between each set of suction and pressure ports for alternately blocking the flow of air through the corresponding said pressure port and said end portion of said intermediate section, and simultaneously sucking and blowing air through the corresponding said suction and pressure ports and alternately within said end portions of said intermediate section to deliver each article through said sections of said conduit.

16. A method of successively conveying articles through a conduit including a first section connected to a second section by in intermediate section having an inlet end portion and an outlet end portion, comprising the steps of locating a suction port and a pressure port within each of said inlet and said outlet end portions of said intermediate section, locating a movable closure member between each set of suction and pressure ports for alternately blocking the flow of air through the corresponding said pressure port and said end portion of said intermediate section, placing each article into the air flow to deliver the article to said intermediate section, and simultaneously sucking and blowing air through the corresponding said suction and pressure ports and alternately within said end portions of said intermediate section to deliver each article through said sections of said conduit.

17. A method of successively conveying live fowls through a conduit having a first portion connected to a second portion by an intermediate portion, comprising the steps of sucking air from said intermediate portion of the conduit to produce a flow of air through said first portion of the conduit toward said intermediate portion, placing each fowl into the air flow to deliver the fowl to said intermediate portion, blowing air into said intermediate portion for producing a pressurized air flow within said second portion of the conduit, and alternately separating the sucking and blowing air in the conduit in front of and in back of each fowl within said intermediate portion to effect transfer of each fowl through said intermediate portion of said conduit.

* * * * *